(12) United States Patent
Washio (10) Patent No.: US 12,444,074 B2
(45) Date of Patent: Oct. 14, 2025

(54) INFORMATION PROCESSING DEVICE, INFORMATION PROCESSING SYSTEM, AND INFORMATION PROCESSING METHOD

(71) Applicant: TOYOTA JIDOSHA KABUSHIKI KAISHA, Aichi-ken (JP)

(72) Inventor: Kota Washio, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 337 days.

(21) Appl. No.: 18/186,204

(22) Filed: Mar. 20, 2023

(65) Prior Publication Data

US 2023/0360252 A1 Nov. 9, 2023

(30) Foreign Application Priority Data

May 9, 2022 (JP) .................... 2022-077136

(51) Int. Cl.
*G06T 7/70* (2017.01)
*G06V 20/59* (2022.01)

(52) U.S. Cl.
CPC .............. *G06T 7/70* (2017.01); *G06V 20/597* (2022.01); *G06T 2207/10016* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 2009/0009302 A1* | 1/2009 | Matsuoka | B60W 40/09 340/425.5 |
| 2019/0370580 A1* | 12/2019 | Aoi | G06V 40/193 |
| 2021/0053565 A1* | 2/2021 | Kim | B60W 30/182 |
| 2021/0394775 A1* | 12/2021 | Julian | G06V 20/58 |

FOREIGN PATENT DOCUMENTS

| | | |
|---|---|---|
| CN | 110909718 A | 3/2020 |
| JP | 2009-15549 A | 1/2009 |

* cited by examiner

*Primary Examiner* — Delomia L Gilliard
(74) *Attorney, Agent, or Firm* — HAUPTMAN HAM, LLP (57) ABSTRACT

An acquisition unit acquires vehicle information and a moving image frame as image information captured by an imaging unit from a database. An extraction unit extracts a captured image in which at least one of a direction of a face of an occupant and a position of a gaze point satisfies a predetermined inattentive driving condition from among captured image in which a vehicle speed is equal to or higher than a predetermined threshold value and a steering angle is within a predetermined range.

4 Claims, 6 Drawing Sheets

☐ : FRONT REGION
▨ : REGION OTHER THAN FRONT REGION
↔ : INATTENTIVE DRIVING

INFORMATION PROCESSING DEVICE, INFORMATION PROCESSING SYSTEM, AND INFORMATION PROCESSING METHOD

CROSS-REFERENCE TO RELATED APPLICATION

This application claims priority to Japanese Patent Application No. 2022-077136 filed on May 9, 2022, incorporated herein by reference in its entirety.

BACKGROUND

1. Technical Field

The present disclosure relates to an information processing device, an information processing system, and an information processing method.

2. Description of Related Art

Japanese Unexamined Patent Application Publication No. 2009-15549 (JP 2009-15549 A) proposes an inattentive driving detection device that detects a direction of the face of a driver and a direction of a line of sight of the driver, and determines whether the driver drives inattentively based on the direction of the line of sight of the driver when a determination unit determines whether the driver drives inattentively based on the direction of the face of the driver, and determines that the driver does not drive inattentively.

SUMMARY

When a driver travels along a curve or travels while looking for a place in a parking lot, the face of the driver faces directions other than a forward direction, so that this is erroneously detected as inattentive driving. There is room for improvement in extracting an inattentive driving scene without erroneous detection from a captured image of the driver since the inattentive driving is erroneously detected only by the direction of the face or the line of sight.

The present disclosure has been made in consideration of the above facts, and an object of the present disclosure is to provide an information processing device, an information processing system, an information processing method, and an information processing program capable of extracting the inattentive driving scene in which erroneous detection is suppressed as compared with a case where the inattentive driving is determined only by the direction of the face or the line of sight.

An information processing device according to a first aspect includes: an acquisition unit that acquires a captured image of a moving image of a face of an occupant, and steering angle information indicating a steering angle of a vehicle and vehicle information indicating a vehicle speed, the steering angle information and the vehicle information corresponding to the captured image; and an extraction unit that extracts a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range.

According to the first aspect, the captured image of the inattentive driving scene is extracted from among the captured images in which the vehicle speed is equal to or higher than the predetermined threshold value and the steering angle is within the predetermined range, so that it is possible to extract the inattentive driving scene in which erroneous detection is suppressed as compared with a case where the inattentive driving is determined only by the direction of the face or the line of sight.

In the information processing device according to a second aspect, in the information processing device according to the first aspect, the extraction unit extracts a captured image in which the inattentive driving condition continues for a predetermined time or longer.

According to the second aspect, the captured image in which the inattentive driving condition continues for the predetermined time or longer is extracted, so that it is possible to reliably extract the captured image of the inattentive driving.

In the information processing device according to a third aspect, in the information processing device according to the first aspect or the second aspect, the extraction unit excludes a captured image in which the inattentive driving condition continues for a predetermined abnormal time or longer.

According to the third aspect, the captured image in which the inattentive driving condition continues for the predetermined abnormal time or longer is excluded, so that it is possible to suppress erroneous determination of the inattentive driving due to communication abnormality or the like.

In the information processing device according to a fourth aspect, in the information processing device according to any one of the first to the third aspects, the extraction unit extracts at least one of a captured image in which an absolute value of the direction of the face is maximum and a captured image in which a distance from a front region to the gaze point is maximum from among the captured images in which the inattentive driving condition is satisfied.

According to the fourth aspect, at least one of the captured image in which the absolute value of the direction of the face is maximum and the captured image in which the distance from the front region to the gaze point is maximum is extracted, so that it is possible to extract a typical inattentive driving scene from among the captured images.

In the information processing device according to a fifth aspect, in the information processing device according to any one of the first to the fourth aspects, the extraction unit preferentially extracts a captured image in which an absolute value of the direction of the face is maximum when both the direction of the face and the position of the gaze point satisfy the inattentive driving condition.

According to the fifth aspect, it is possible to extract a typical inattentive driving scene rather than extracting the captured image in which the distance from the front region to the gaze point is maximum.

An information processing system according to a sixth aspect includes: a vehicle including an imaging unit that captures an image of a face of an occupant and that generates a captured image of a moving image; and an information processing device including an acquisition unit that acquires the captured image of the moving image of the face of the occupant, and steering angle information indicating a steering angle of the vehicle and vehicle information indicating a vehicle speed, the steering angle information and the vehicle information corresponding to the captured image, and an extraction unit that extracts a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range.

According to the sixth aspect, it is possible to provide the information processing system capable of extracting the inattentive driving scene in which erroneous detection is suppressed as compared with a case where the inattentive driving is determined only by the direction of the face or the line of sight.

An information processing method according to a seventh aspect is a method in which a computer executes processes including: acquiring a captured image of a moving image of a face of an occupant, and steering angle information indicating a steering angle of a vehicle and vehicle information indicating a vehicle speed, the steering angle information and the vehicle information corresponding to the captured image; and extracting a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range.

According to the seventh aspect, it is possible to provide the information processing method capable of extracting the inattentive driving scene in which erroneous detection is suppressed as compared with a case where the inattentive driving is determined only by the direction of the face or the line of sight.

An information processing program according to an eighth aspect causes a computer to execute processes including: acquiring a captured image of a moving image of a face of an occupant, and steering angle information indicating a steering angle of a vehicle and vehicle information indicating a vehicle speed, the steering angle information and the vehicle information corresponding to the captured image; and extracting a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range.

According to the eighth aspect, it is possible to provide the information processing program capable of extracting the inattentive driving scene in which erroneous detection is suppressed as compared with a case where the inattentive driving is determined only by the direction of the face or the line of sight.

As described above, according to the present disclosure, it is possible to provide the information processing device, the information processing system, the information processing method, and the information processing program capable of extracting the inattentive driving scene in which erroneous detection is suppressed as compared with a case where the inattentive driving is determined only by the direction of the face or the line of sight.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
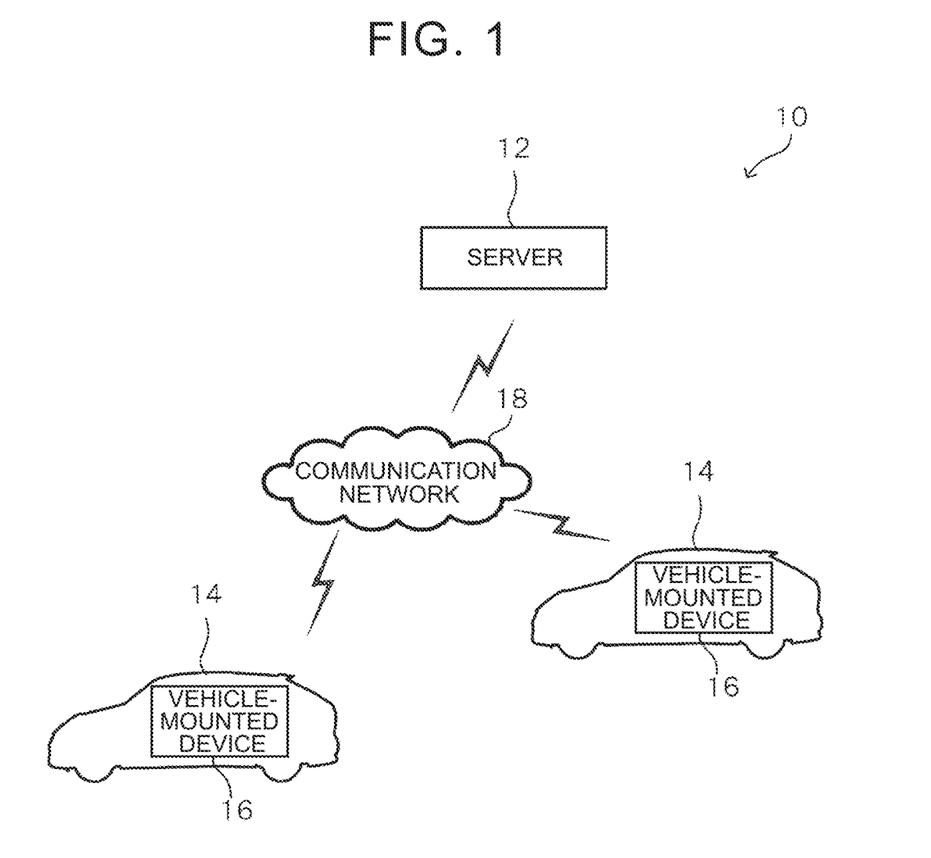
FIG. 1 is a diagram showing a schematic configuration of an information processing system according to the present embodiment.

Hereinafter, an example of an embodiment of the present disclosure will be described in detail with reference to the drawings. FIG. 1 is a diagram showing a schematic configuration of an information processing system according to the present embodiment.

In an information processing system 10 according to the present embodiment, a vehicle-mounted device 16 mounted on a vehicle 14 and a server 12 as an example of an information processing device are connected via a communication network 18. In the information processing system 10 according to the present embodiment, image information obtained by capturing images by a plurality of the vehicle-mounted devices 16 and vehicle information indicating the state of each vehicle 14 are transmitted to the server 12, and the server 12 accumulates the image information and the vehicle information. Based on the accumulated image information and vehicle information, the server 12 performs a process of extracting a captured image of a dozing scene of the driver.

Figure 2:
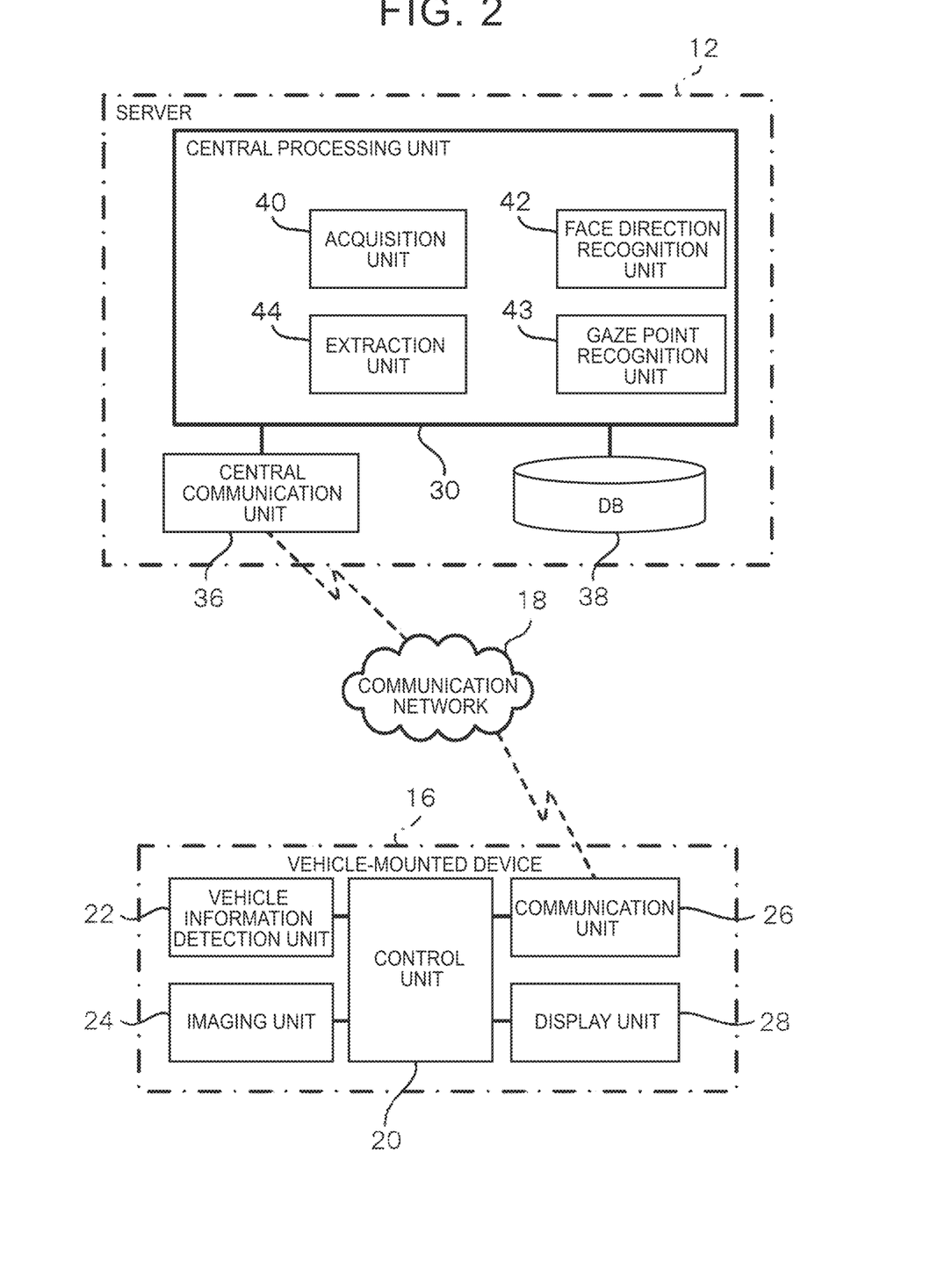
FIG. 2 is a functional block diagram showing a functional configuration of a vehicle-mounted device and a server in the information processing system according to the present embodiment.

FIG. 2 is a functional block diagram showing a functional configuration of the vehicle-mounted device 16 and the server 12 in the information processing system 10 according to the present embodiment.

The vehicle-mounted device 16 includes a control unit 20, a vehicle information detection unit 22, an imaging unit 24, a communication unit 26, and a display unit 28.

The vehicle information detection unit 22 detects the vehicle information regarding the vehicle 14. In the present embodiment, vehicle speed information indicating a vehicle speed and steering angle information indicating a steering angle are acquired as an example of the vehicle information, but vehicle information other than the vehicle speed and the steering angle may also be detected. For example, the vehicle information such as position information, acceleration, and an accelerator operation amount of the vehicle 14, and a distance and a route to an obstacle around the vehicle 14 is detected. More specifically, a plurality of types of sensors and devices that acquire information indicating what kind of situation the surrounding environment of the vehicle 14 is can be applied to the vehicle information detection unit 22. Examples of the sensors and the devices include sensors mounted on the vehicle 14 such as a vehicle speed sensor, a steering angle sensor, and an acceleration sensor, a global navigation satellite system (GNSS) device, a vehicle-mounted communication device, a navigation system, and a radar device. The GNSS device receives a GNSS signal including time information from a plurality of GNSS satellites and measures the position of the own vehicle 14. The positioning accuracy of the GNSS device improves as the number of receivable GNSS signals increases. The vehicle-mounted communication device is a communication device that performs at least one of vehicle-to-vehicle communication with other vehicles 14 and road-to-vehicle communication with a roadside device via the communication unit 26. The navigation system includes a map information storage unit that stores map information, and displays the position of the own vehicle 14 on a map based on the position information obtained from the GNSS device and the map information stored in the map information storage unit, and performs a process of guiding the route to the destination. Further, the radar device includes a plurality of radars with different detection ranges, detects objects such as pedestrians and other vehicles 14 existing around the vehicle 14, and acquires the relative positions and the relative speeds of the detected objects and the vehicle 14. Further, the radar device incorporates a processing device for processing the searching results of the surrounding objects. The processing device excludes noise and a roadside object such as guardrails from a monitoring target based on changes in the relative position and the relative speed of each object included in the most recent searching results, and follows and monitors the pedestrians, the other vehicles 14, and the like as objects to be monitored. The radar device then outputs information such as the relative position and the relative speed with respect to each object to be monitored.

In the present embodiment, the imaging unit 24 is mounted in the vehicle cabin, captures an image of the driver, and generates image data representing a captured image of a moving image. The imaging unit 24 may further capture at least one of images of areas around the vehicle 14 from among an image of an area forward of the vehicle 14, an image of an area on the side of the vehicle 14, and an image of an area rearward of the vehicle 14.

The communication unit 26 establishes communication with the server 12 via the communication network 18 and transmits and receives information such as the image information obtained by capturing the images by the imaging unit 24 and the vehicle information detected by the vehicle information detection unit 22.

The display unit 28 provides various kinds of information to an occupant by displaying information. In the present embodiment, information provided from the server 12 and the like are displayed.

Figure 3:
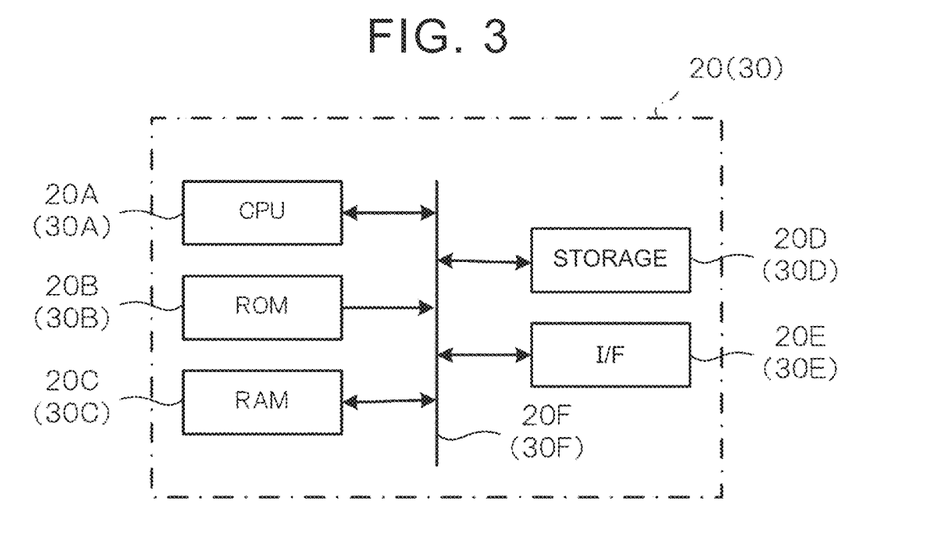
FIG. 3 is a block diagram showing a configuration of a control unit and a central processing unit.

As shown in FIG. 3, the control unit 20 is composed of a general microcomputer including a central processing unit (CPU) 20A, a read-only memory (ROM) 20B, a random access memory (RAM) 20C, a storage 20D, an interface (I/F) 20E, a bus 20F, and the like. Further, the control unit 20 performs control such as uploading, to the server 12, the image information indicating the image captured by the imaging unit 24 and the vehicle information detected by the vehicle information detection unit 22 when the image is captured.

On the other hand, the server 12 includes a central processing unit 30, a central communication unit 36, and a database (DB) 38.

The central processing unit 30, as shown in FIG. 3, is composed of a general microcomputer including a CPU 30A, a ROM 30B, a RAM 30C, a storage 30D, an interface (I/F) 30E, a bus 30F, and the like. The central processing unit 30 has functions of an acquisition unit 40, a face direction recognition unit 42, a gaze point recognition unit 43, and an extraction unit 44, as shown in FIG. 2. Each function of the central processing unit 30 is realized by executing a program stored in the ROM 30B or the like using the CPU 30A.

The acquisition unit 40 acquires the vehicle information and a moving image frame as the image information captured by the imaging unit 24 from the DB 38. Specifically, the vehicle information and the moving image frame are synchronized with each other by adjusting the time of the vehicle information and the moving image frame, so that information is acquired.

The face direction recognition unit 42 extracts the face of the driver from the captured image of the driver and recognizes the direction of the face. The face direction recognition unit 42 recognizes the direction of the face of the driver by image recognition. For example, the direction of the face of the driver is recognized using a model learned in advance by machine learning or the like.

The gaze point recognition unit 43 recognizes the gaze point of the driver from the captured image of the driver. The gaze point recognition unit 43 recognizes the gaze point of the driver by image recognition. For example, the gaze point of the driver is recognized using a model learned in advance by machine learning or the like.

The extraction unit 44 extracts a captured image corresponding to an inattentive driving scene in which the driver inattentively drives from among the captured images of the moving images based on the vehicle information acquired by the acquisition unit 40 and the recognition results by the face direction recognition unit 42 and the gaze point recognition unit 43. In the present embodiment, the extraction unit 44 extracts a captured image in which at least one of the direction of the face of the occupant and the position of the gaze point satisfies a predetermined inattentive driving condition, from among the captured images in which the vehicle speed is equal to or higher than a predetermined threshold value and the steering angle is in a predetermined range. As a result, it is possible to suppress erroneous detection of the inattentive driving when the driver is searching for a place such as a parking lot at a low speed depending on a vehicle speed condition. In addition, it is possible to suppress erroneous detection of the inattentive driving when the line of sight and the direction of the face of the driver are not in a frontal region, such as when traveling along a curve, depending on a steering angle condition.

The central communication unit 36 establishes communication with the vehicle-mounted device 16 via the communication network 18 to transmit and receive the information such as the image information and the vehicle information.

The DB 38 receives the image information and the vehicle information from the vehicle-mounted device 16, and accumulates the received image information and vehicle information in association with each other.

In the information processing system 10 configured as described above, the image information captured by the imaging unit 24 of the vehicle-mounted device 16 is transmitted to the server 12 together with the vehicle information and is accumulated in the DB 38. Then, the server 12 performs a process of extracting the captured image corresponding to the inattentive driving scene based on the image information and the vehicle information accumulated in the DB 38.

Here, the extraction of the captured image corresponding to the inattentive driving scene of the driver by the extraction unit 44 of the server 12 will be described in detail.

The extraction unit 44 starts extracting the inattentive driving scene when a predetermined inattentive driving detection start condition is satisfied. Specifically, the extraction of the inattentive driving scene is started when the vehicle speed is equal to or higher than a predetermined vehicle speed (for example, 10 km), the steering angle is within a predetermined range (for example, within the range of −60°<steering angle <60°), and any one of 1 to 3 described below is satisfied as an example of the predetermined inattentive driving condition.

1. Direction of face <−29° or less, or direction of face >29°
2. Gaze point in horizontal direction ≤−3, or gaze point in horizontal direction ≥3
3. −2≤gaze point in horizontal direction 2, and gaze point in vertical direction ≤−3

Figure 4:
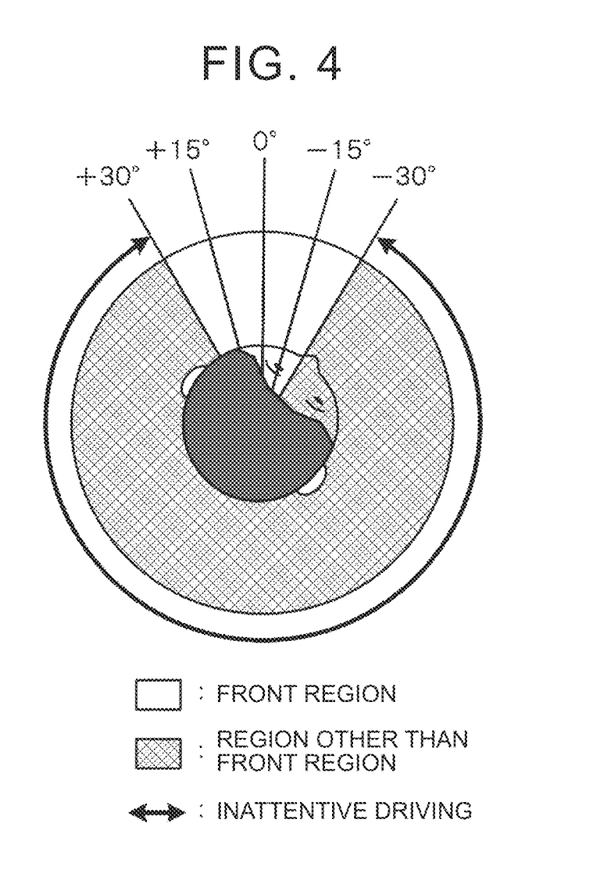
FIG. 4 is a diagram for describing a method for determining a direction of a face of a driver.
Figure 5:
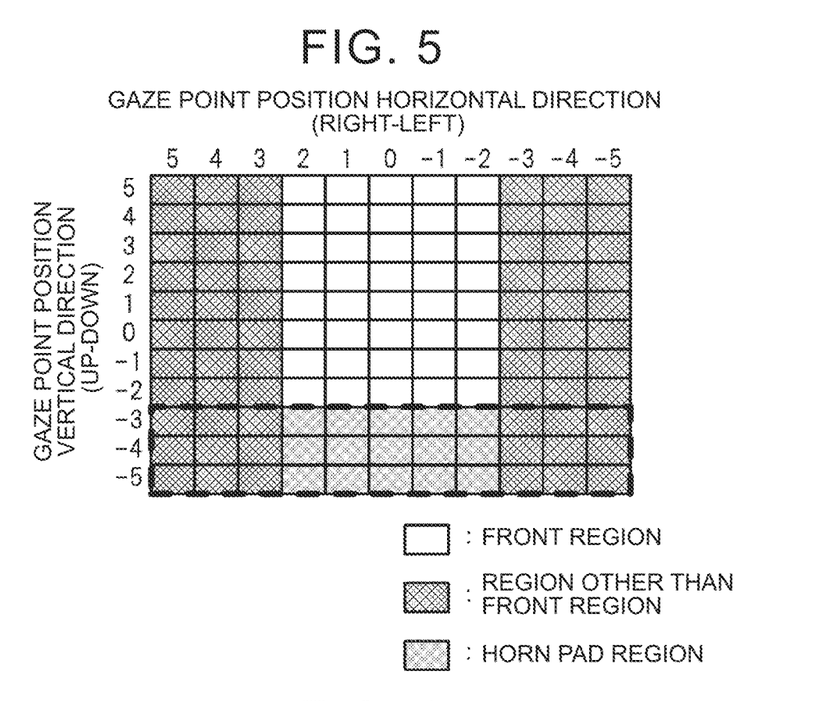
FIG. 5 is a diagram for describing a method for determining the direction of the face from a gaze point.
Figure 6:
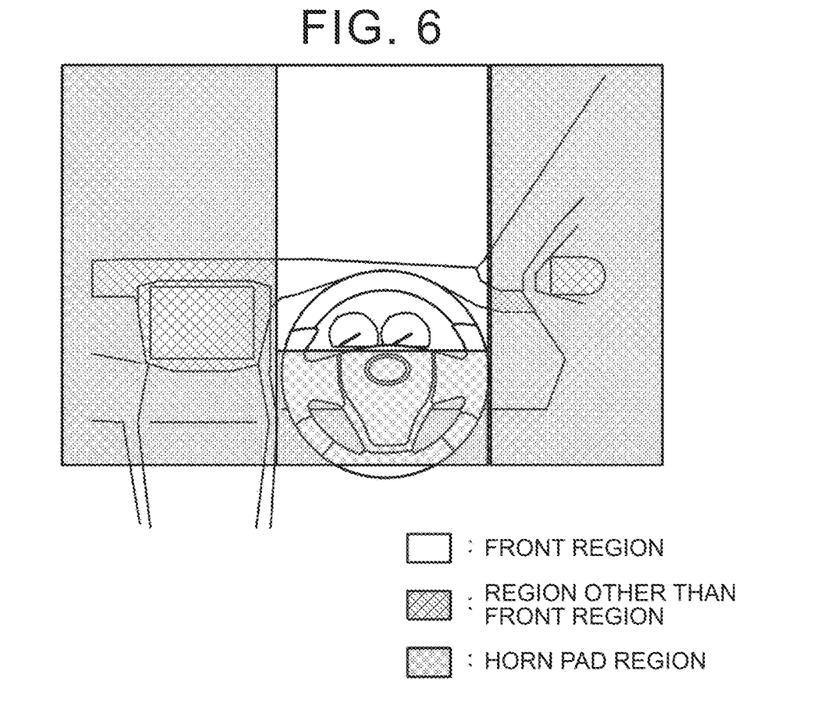
FIG. 6 is a diagram showing correspondence between a field of view seen by the driver and the direction of the face.

As shown in FIG. 4, the direction of the face is determined to be in the front region from −30° to +30° when viewed from the top of the driver, and the range other than this is determined to be the region other than the front region and the inattentive driving. Further, as shown in FIG. 5, the region of the gaze point is divided into positive five to negative five regions in each direction of the gaze point position horizontal direction (right-left direction) and the gaze point position vertical direction (up-down direction), and the region of the gaze point is detected. Then, the range in which the gaze point is from positive two to negative two in the gaze point position horizontal direction and the gaze point is from positive five to negative two in the gaze point position vertical direction is determined that the driver is facing forward. The range in which the gaze point is positive three or more or negative three or less in the gaze point position horizontal direction is determined to be the region other than the front region. Further, the range in which the gaze point is positive two to negative two in the gaze point position horizontal direction and the gaze point is negative three or less in the gaze point position vertical direction is determined to be the horn pad region. The front region, the region other than the front region, and the horn pad region in FIG. 5 are regions shown in FIG. 6 when viewed from the driver.

Further, the extraction unit 44 ends the extraction of the inattentive driving scene when the start condition for extracting the inattentive driving scene is canceled as a predetermined inattentive driving detection end condition.

Figure 7:
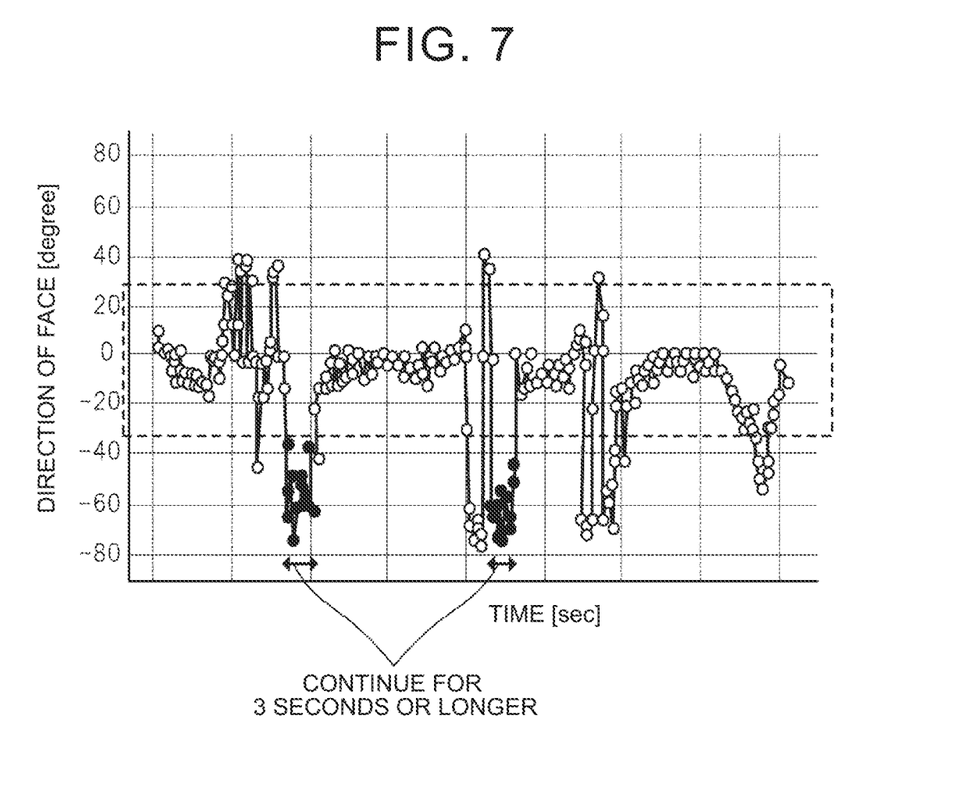
FIG. 7 is a diagram for describing an example of extraction of a captured image of inattentive driving.

In addition, the extraction unit 44 counts duration for which the start condition for extracting the inattentive driving scene is satisfied, and determines that the inattentive driving is performed when the condition continues for a predetermined time (for example, 3 seconds) or longer. For example, when the vehicle speed is equal to or higher than the predetermined speed (for example, 10 km) and the steering angle is within the predetermined range, as shown by the black dots in FIG. 7, a captured image in which the direction of the face is in the region other than the front region for 3 seconds or longer is extracted as the inattentive driving scene. The region surrounded by the dotted line in FIG. 7 indicates a region where the direction of the face is determined to be in the front region, and the region outside the dotted line is a region where the direction of the face is determined to be in the region other than the front region. From among the extracted captured images of the inattentive driving scene, a captured image in which the inattentive driving is easily found may be extracted. For example, a captured image in which the absolute value of the direction of the face is maximum or minimum may be preferentially extracted. Alternatively, a captured image in which the position of the gaze point is in the maximum region or the minimum region may be preferentially extracted. Alternatively, a captured image in which both the direction of the face and the position of the gaze point are determined to be in the region other than the front region may be preferentially extracted.

In addition, when the above-described inattentive driving detection start condition is satisfied and the inattentive driving condition continues for a predetermined abnormal time (for example, 15 seconds) or longer, the extraction unit 44 excludes the captured image in which the inattentive driving condition continues for the predetermined abnormal time or longer from the inattentive driving scene. As a result, it is possible to suppress erroneous determination of the inattentive driving due to communication abnormality or the like.

Figure 8:
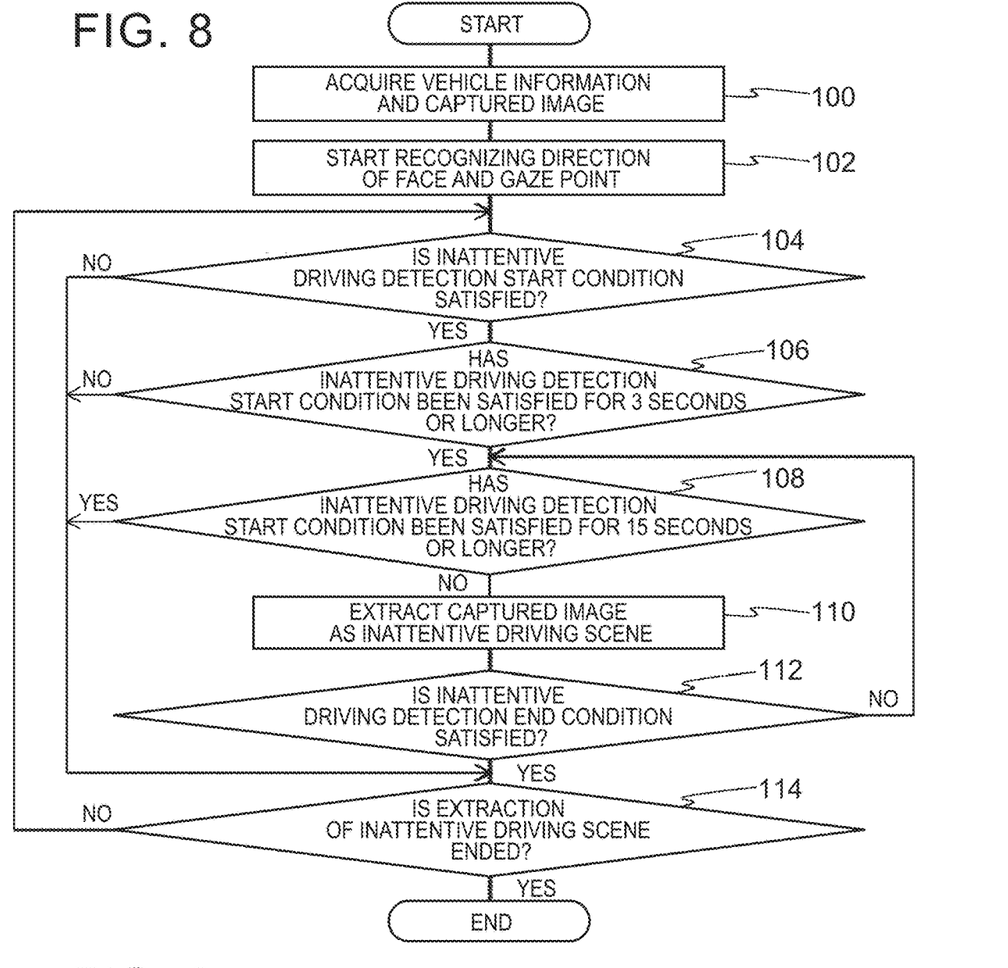
FIG. 8 is a flowchart showing an example of a flow of a process performed by a server in the information processing system according to the present embodiment.

Next, a specific process performed by the server 12 of the information processing system 10 according to the present embodiment configured as described above will be described. FIG. 8 is a flowchart showing an example of a flow of the process performed by the server 12 in the information processing system 10 according to the present embodiment. The process of FIG. 8 is started, for example, when an instruction for starting the extraction of the inattentive driving scene is transmitted to the server 12.

In step 100, the CPU 30A acquires the vehicle information and the captured image, and proceeds to step 102. That is, the acquisition unit 40 acquires the vehicle information and the moving image frame as the image information captured by the imaging unit 24 from the DB 38. Specifically, the vehicle information and the moving image frame are synchronized with each other by adjusting the time of the vehicle information and the moving image frame, so that information is acquired.

In step 102, the CPU 30A starts recognizing the direction of the face and the gaze point, and proceeds to step 104. That is, the recognition of the direction of the face of the driver by the face direction recognition unit 42 and the recognition of the gaze point of the driver by the gaze point recognition unit 43 are started.

In step 104, the CPU 30A determines whether the predetermined inattentive driving detection start condition is satisfied. In this determination, it is determined whether the vehicle speed is equal to or higher than the predetermined vehicle speed (for example, 10 km), the steering angle is within the predetermined range (for example, within the range of −60°<steering angle <60°), and the inattentive driving condition as specified in 1 to 3 described above is satisfied. When the determination is Yes, the process proceeds to step 106, and when the determination is No, the process proceeds to step 114.

In step 106, the CPU 30A determines whether the inattentive driving detection start condition has been satisfied for 3 seconds or longer. When the determination is Yes, the process proceeds to step 108, and when the determination is No, the process proceeds to step 114.

In step 108, the CPU 30A determines whether the inattentive driving detection start condition has been satisfied for 15 seconds or longer. When the determination is No, the process proceeds to step 110, and when the determination is Yes, the process proceeds to step 114 by excluding the captured image in which the inattentive driving condition continues for the predetermined abnormal time or longer from the inattentive driving scene because there is a possibility of communication abnormality or the like.

In step 110, the CPU 30A extracts the captured image as the inattentive driving scene, and proceeds to step 112.

In step 112, the CPU 30A determines whether the inattentive driving detection end condition is satisfied. When the determination is No, the process returns to step 108 to repeat the above process, and when the determination is Yes, the process proceeds to step 114.

In step 114, the CPU 30A determines whether the extraction of the inattentive driving scene is ended. In this determination, for example, it is determined whether the extraction of the inattentive driving scene has been ended for the target captured image by the above process. When the determination is No, the process returns to step 104 to repeat the above process, and when the determination is Yes, the series of process ends. From among the extracted captured images of the inattentive driving scene, a captured image in which the inattentive driving is easily found may be extracted. For example, a captured image in which the absolute value of the direction of the face is maximum or minimum may be preferentially extracted. Alternatively, a captured image in which the position of the gaze point is in the maximum region or the minimum region may be preferentially extracted. Alternatively, a captured image in which both the direction of the face and the position of the gaze point are determined to be in the region other than the front region may be preferentially extracted. As a result, it is possible to obtain the captured image of the typical inattentive driving.

By performing the process by the server 12 as described above, the captured image of the inattentive driving scene is extracted from the captured images in which the vehicle speed is equal to or higher than the predetermined threshold value and the steering angle is within the predetermined range. Therefore, it is possible to extract the captured image of the inattentive driving scene in which erroneous detection is suppressed as compared with a case where the inattentive driving is determined only by the direction of the face or the line of sight.

In addition, the extraction unit 44 extracts the captured image in which the inattentive driving condition continues for the predetermined time (for example, 3 seconds) or longer, so that the captured image in which the inattentive driving is performed can be reliably extracted.

In addition, the extraction unit 44 excludes the captured image in which the inattentive driving condition continues for the predetermined abnormal time (for example, seconds) or longer, so that the erroneous determination of the inattentive driving due to communication abnormality or the like can be suppressed.

In addition, the extraction unit 44 extracts at least one of the captured image in which the absolute value of the direction of the face is maximum and the captured image in which the distance from the front region to the gaze point is maximum from among the captured images in which the inattentive driving condition is satisfied, so that it is possible to extract the typical inattentive driving scene from among the captured images.

Further, when both the direction of the face and the position of the gaze point satisfy the inattentive driving condition, the extraction unit 44 preferentially extracts the captured image in which the absolute value of the direction of the face is maximum, so that it is possible to extract the typical inattentive driving scene as compared with a case where the captured image in which the distance from the front region to the gaze point is maximum is extracted.

In the above-described embodiment, the face direction recognition unit 42 and the gaze point recognition unit 43 are provided, but a configuration in which only one of them is provided may be employed. In this case, the extraction unit 44 extracts the captured image in which the direction of the face of the occupant or the position of the gaze point satisfies the predetermined inattentive driving condition from among the captured images in which the vehicle speed is equal to or higher than the predetermined threshold value and the steering angle is within the predetermined range.

Figure 9:
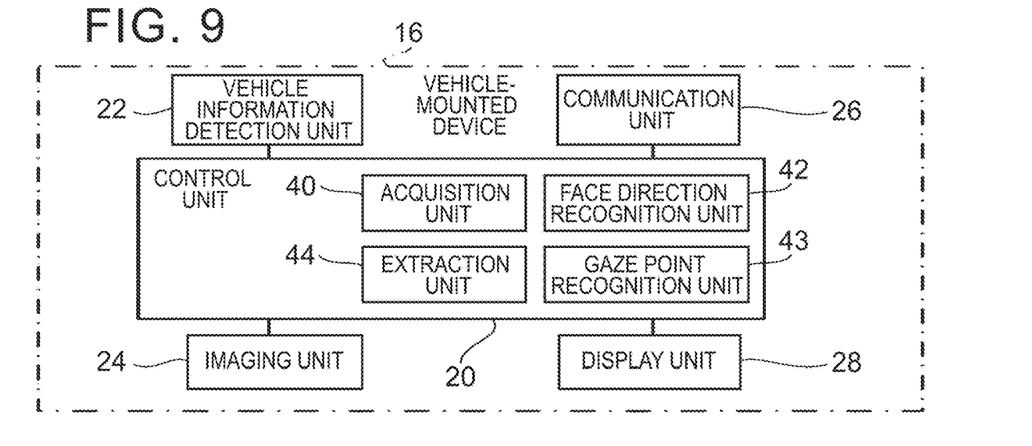
FIG. 9 is a functional block diagram showing a functional configuration of the vehicle-mounted device when functions of the central processing unit are provided in the control unit on the vehicle-mounted device side.

In the above-described embodiment, the example in which the server 12 performs the process of extracting the inattentive driving scene has been described, but the present disclosure is not limited to this. For example, as shown in FIG. 9, the functions of the central processing unit 30 of FIG. 2 may be provided in the control unit 20 on the vehicle-mounted device 16 side, and the control unit 20 may execute the process of FIG. 8. That is, the control unit 20 may have the functions of the acquisition unit 40, the face direction recognition unit 42, the gaze point recognition unit 43, and the extraction unit 44. In this case, the acquisition unit 40 acquires the vehicle information from the vehicle information detection unit 22, acquires the moving image frame from the imaging unit 24, and the vehicle-mounted device 16 is an example of the information processing device. Alternatively, a configuration may be employed in which a plurality of servers is provided and the above functions are distributed to reduce the load on each server.

Further, the process performed by each unit of the information processing system 10 in each of the above embodiments may be a process performed by a software by executing a program, or a process performed by hardware such as a graphics processing unit (GPU), an application specific integrated circuit (ASIC), and a field-programmable gate array (FPGA). Alternatively, the process may be a combination of both the software and the hardware. When the process performed by the software is adopted, the program may be stored in various storage media and distributed.

Further, the present disclosure is not limited to the above-described embodiments, and it goes without saying that other than the above-described embodiments, various modifications can be made without departing from the scope of the present disclosure.

What is claimed is:

1. An information processing device comprising:
a processor configured to execute instructions for:
acquiring a captured image of a moving image of a face of an occupant, and steering angle information indicating a steering angle of a vehicle and vehicle information indicating a vehicle speed, the steering angle information and the vehicle information corresponding to the captured image; and
extracting a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range, wherein:
the extracting extracts a captured image in which the inattentive driving condition continues for a predetermined time or longer and less than a predetermined abnormal time;
the extracting excludes a captured image in which the inattentive driving condition continues for the predetermined abnormal time or longer; and
the extracting extracts at least one of a captured image in which an absolute value of the direction of the face is maximum and a captured image in which a distance from a front region to the gaze point is maximum from among the captured images in which the inattentive driving condition is satisfied.

2. The information processing device according to claim 1, wherein the processor is further configured to preferentially extract a captured image in which the absolute value of the direction of the face is maximum when both the direction of the face and the position of the gaze point satisfy the inattentive driving condition.

3. An information processing system comprising:
   a vehicle including a sensor that captures an image of a face of an occupant and that generates a captured image of a moving image; and
   a processor configured to execute instructions for:
      acquiring the captured image of the moving image of the face of the occupant, and steering angle information indicating a steering angle of the vehicle and vehicle information indicating a vehicle speed, the steering angle information and the vehicle information corresponding to the captured image, and
      extracting a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range, wherein:
   the extracting extracts a captured image in which the inattentive driving condition continues for a predetermined time or longer and less than a predetermined abnormal time;
   the extracting excludes a captured image in which the inattentive driving condition continues for the predetermined abnormal time or longer; and
   the extracting extracts at least one of a captured image in which an absolute value of the direction of the face is maximum and a captured image in which a distance from a front region to the gaze point is maximum from among the captured images in which the inattentive driving condition is satisfied.

4. An information processing method in which a computer executes processes comprising:
   acquiring a captured image of a moving image of a face of an occupant, and steering angle information indicating a steering angle of a vehicle and vehicle information indicating a vehicle speed, the steering angle information and the vehicle information corresponding to the captured image; and
   extracting a captured image in which at least one of a direction of the face of the occupant and a position of a gaze point satisfies a predetermined inattentive driving condition, from among the captured images in which the vehicle speed is equal to or higher than a predetermined threshold value and the steering angle is in a predetermined range, wherein:
   the extracting extracts a captured image in which the inattentive driving condition continues for a predetermined time or longer and less than a predetermined abnormal time;
   the extracting excludes a captured image in which the inattentive driving condition continues for the predetermined abnormal time or longer; and
   the extracting extracts at least one of a captured image in which an absolute value of the direction of the face is maximum and a captured image in which a distance from a front region to the gaze point is maximum from among the captured images in which the inattentive driving condition is satisfied.

* * * * *